US009830456B2

(12) United States Patent
Grieco et al.

(10) Patent No.: US 9,830,456 B2
(45) Date of Patent: Nov. 28, 2017

(54) TRUST TRANSFERENCE FROM A TRUSTED PROCESSOR TO AN UNTRUSTED PROCESSOR

(71) Applicant: Cisco Technology, Inc., San Jose, CA (US)

(72) Inventors: Anthony H. Grieco, Wake Forest, NC (US); Chirag Shroff, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 421 days.

(21) Appl. No.: 14/058,784

(22) Filed: Oct. 21, 2013

(65) Prior Publication Data

US 2015/0113258 A1    Apr. 23, 2015

(51) Int. Cl.
*G06F 21/57* (2013.01)

(52) U.S. Cl.
CPC .......... *G06F 21/575* (2013.01); *G06F 21/572* (2013.01)

(58) Field of Classification Search
CPC ............................. G06F 21/575; G06F 9/4401
See application file for complete search history.

(56) References Cited

U.S. PATENT DOCUMENTS

| | | | |
|---|---|---|---|
| 5,937,063 A * | 8/1999 | Davis | 713/187 |
| 6,128,656 A | 10/2000 | Matchefts et al. | |
| 7,194,623 B1 * | 3/2007 | Proudler | G06F 21/552 |
| | | | 710/261 |
| 7,979,854 B1 | 7/2011 | Barole et al. | |
| 8,429,423 B1 * | 4/2013 | King | G06F 11/302 |
| | | | 713/193 |
| 8,839,004 B1 * | 9/2014 | Bennett et al. | 713/193 |

(Continued)

FOREIGN PATENT DOCUMENTS

GB    2457172 A    8/2009

OTHER PUBLICATIONS

International Search Report and Written Opinion in counterpart International Application No. PCT/US2014/059013, dated Jul. 14, 2015, 9 pages.

(Continued)

*Primary Examiner* — Thomas Lee
*Assistant Examiner* — Gary Collins
(74) *Attorney, Agent, or Firm* — Edell, Shapiro & Finnan, LLC

(57) ABSTRACT

A trusted processor is pre-booted using a secure pre-boot loader integrated with the trusted processor. The trusted processor verifies whether an external boot loader is valid, and when valid, the trusted processor is booted using the external boot loader, thereby enabling trusted operation of the trusted processor. The trusted processor verifies whether a firmware image for a field programmable device is valid, and when valid, a firmware image loading process for the field programmable device is triggered. When the firmware image loading process is triggered, the firmware image is loaded into the field programmable device and the field programmable device is released to execute of the firmware image. The field programmable device verifies whether an external boot loader for an untrusted processor is valid, and when valid, the untrusted processor is booted using the external boot loader for the untrusted processor, thereby enabling trusted operation of the untrusted processor.

12 Claims, 6 Drawing Sheets

(56) References Cited

U.S. PATENT DOCUMENTS

| | | | |
|---|---|---|---|
| 9,230,112 B1* | 1/2016 | Peterson | G06F 21/575 |
| 2004/0003288 A1* | 1/2004 | Wiseman | G06F 21/57 |
| | | | 726/30 |
| 2005/0141717 A1* | 6/2005 | Cromer | G06F 21/575 |
| | | | 380/277 |
| 2006/0026417 A1* | 2/2006 | Furusawa | G06F 21/575 |
| | | | 713/2 |
| 2006/0179302 A1* | 8/2006 | Hatakeyama | 713/164 |
| 2007/0130452 A1* | 6/2007 | Muir | G06F 21/572 |
| | | | 713/1 |
| 2009/0147945 A1* | 6/2009 | Doi | H04L 9/002 |
| | | | 380/2 |
| 2009/0198991 A1 | 8/2009 | Owens et al. | |
| 2009/0204801 A1* | 8/2009 | Smith et al. | 713/1 |
| 2010/0125739 A1* | 5/2010 | Creary | H04L 9/0822 |
| | | | 713/189 |
| 2012/0102333 A1* | 4/2012 | Wong | G06F 21/10 |
| | | | 713/189 |
| 2012/0303941 A1 | 11/2012 | Grieco et al. | |
| 2013/0091345 A1 | 4/2013 | Shroff et al. | |

OTHER PUBLICATIONS

Ramia, et al., "RC6 Implementation including key scheduling using FPGA," ECE 646 Project, Dec. 2006, pp. 1-10.
James Greene, Intel Corporation, "Intel Trusted Execution Technology", 2010, pp. 1-8.
Secure Boot for QorIQ Communications Processors, freescale.com, 2011, 4 pages.
Security Processors, "NITROX III Family of Security Processors", CAVIUM, 2011, 2 pages.

\* cited by examiner

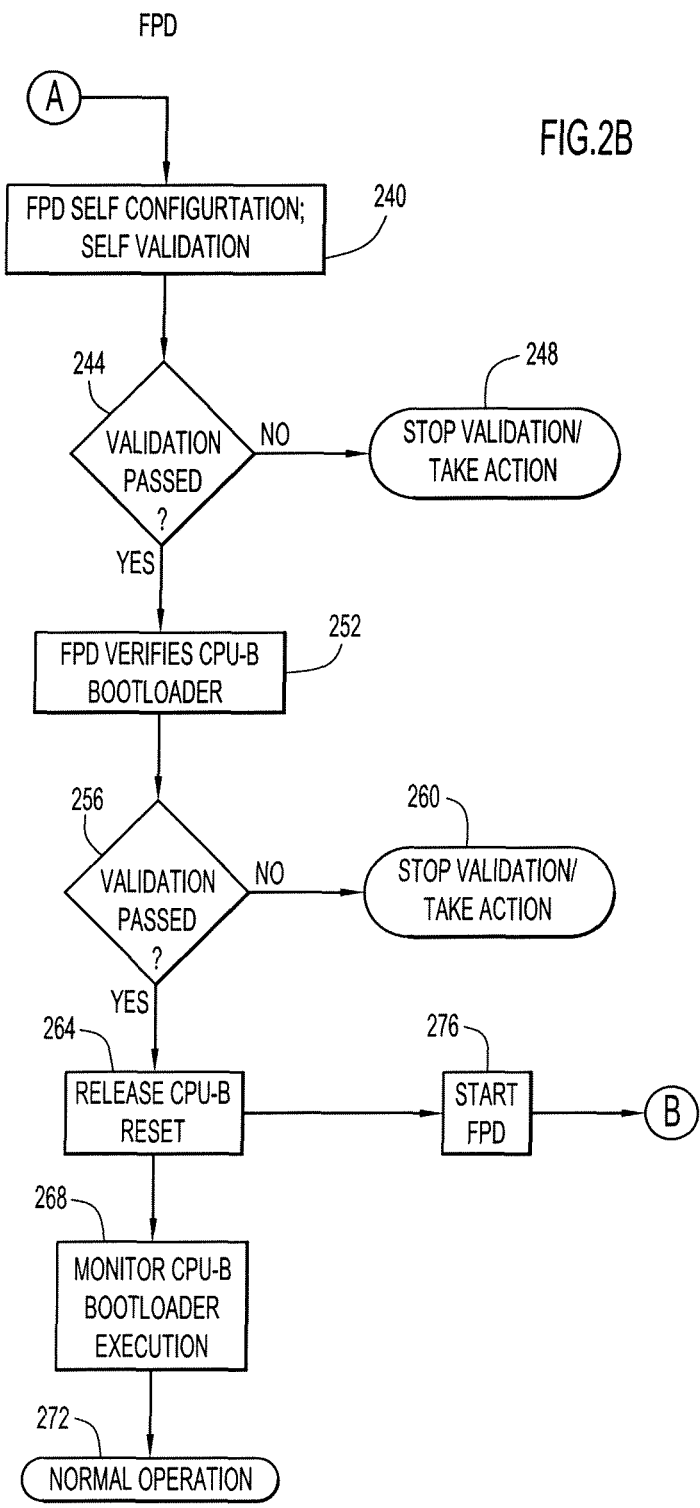

TRUST TRANSFERENCE FROM A TRUSTED PROCESSOR TO AN UNTRUSTED PROCESSOR

TECHNICAL FIELD

The present disclosure relates to securely transferring trust from a secure processor to an unsecure processor to ensure the secure operation of the previously unsecure processor, thereby forming a chain of trust from the first processor through the second processor.

BACKGROUND

Modern embedded systems are more complex and may contain multiple processors in a multi-processor scheme, e.g., multiple processors, micro-controllers or other programmable firmware elements. Automobiles, routers, cell phones, among other systems may include such a multi-processor scheme. In order to provide a secure processor boot, these systems may employ security for a single processor without proving security for secondary processors, e.g., due to cost constraints. A secure processor ensures that the secure processor operates using authorized software, as opposed to bootleg, counterfeit, or compromised software. In other words, the designers for these embedded systems make an investment in one particular Central Processing Unit (CPU) in the system to "securely" boot that processor.

BRIEF DESCRIPTION OF THE DRAWINGS

FIGS. 2A, 2B, and 2C are flowcharts of a specific example process for generating the processing chain of trust.

DESCRIPTION OF EXAMPLE EMBODIMENTS

Overview

In one embodiment, a method includes pre-booting a trusted processor using a secure pre-boot loader integrated with the trusted processor. The trusted processor verifies whether an external boot loader for the trusted processor is valid. When the external boot loader for the secure processor is valid, the trusted processor is booted using the external boot loader, thereby enabling trusted operation of the trusted processor. The trusted processor verifies whether a firmware image for a field programmable device is valid, and when the firmware image for the field programmable device is valid, a firmware image loading process is triggered for the field programmable device.

When the firmware image loading process is triggered, the firmware image is loaded into the field programmable device. The field programmable device is released to execute the firmware image. The field programmable device verifies whether an external boot loader for an untrusted processor is valid. When the external boot loader for the untrusted processor is valid, the untrusted processor is booted using the external boot loader for the untrusted processor.

Example Embodiments

Figure 1:
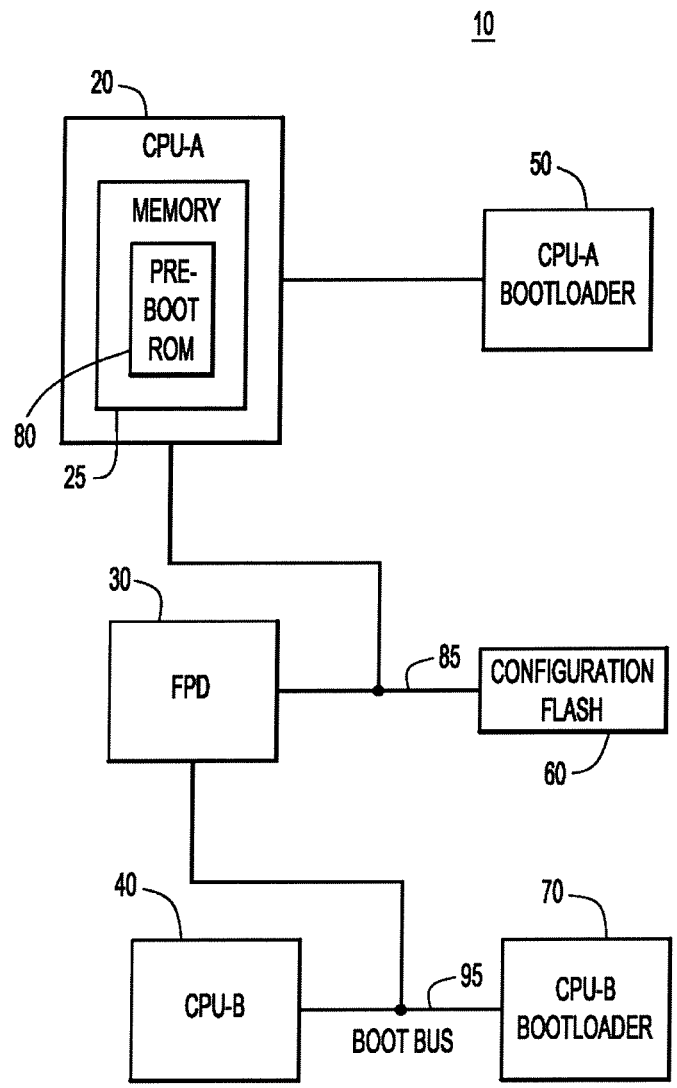
FIG. 1 shows an example device including a plurality of processors and a field programmable device (FPD) configured to generate a processing chain of trust that originates with a trusted computing base (TCB).

FIG. 1 shows an example block diagram of a computing device 10 configured according to the techniques described herein. Computing device 10 includes a processing chain that may comprise a first processor 20 labeled as "CPU-A," an FPD 30, e.g., an application specific integrated circuit (ASIC) or a Field Programmable Gate Array (FPGA), and a second processor 40 labeled as "CPU-B." CPU-A 20 has an integrated pre-boot Read-Only Memory (ROM) 80 and an associated CPU-A boot loader 50. FPD 30 has an associated configuration Programmable ROM (PROM), non-volatile memory (NVM), or flash memory 60, and CPU-B 40 has an associated CPU-B boot loader 70. Circuit 10 may include one or more network interfaces (not shown) to provide network connectivity. In this regard, circuit 10 may be part of a switch, router, server, cell phone, or other embedded system, e.g., a line card or control plane device.

The integrated pre-boot ROM 80 includes pre-boot functionality to partially start CPU-A 20 in order to provide a mechanism to ensure that a trusted boot process is loaded from boot loader 50. For example, pre-boot ROM 80 provides firmware code or state machine logic that is trusted and that may provide security functions that include authentication/verification, decryption, and/or integrity check functions for boot loader 50, e.g., decryption keys, hash algorithms, etc. A boot loader image from boot loader 50 brings CPU-A 20 up to a complete trusted operating configuration. As boot loader firmware from boot loader 50 loads and executes, the desired security functions provided by pre-boot ROM 80 ensure trusted operation of CPU-A 20. The combination of CPU-A 20 and pre-boot ROM 80 provide a first stage in a trusted computing chain. In other words, once CPU-A 20 is fully operational, e.g., as verified by the pre-boot functions provided via pre-boot ROM 80, the operations performed by CPU-A 20 are trusted according to a configured degree of security.

Once CPU-A 20 trusted operation has been achieved, CPU-A 20 may be configured to examine configuration flash 60 to determine the integrity of the FPD image stored therein. For example, CPU-A 20 may retrieve, authenticate, and decrypt the flash image to validate the image. Once the flash image is deemed valid, CPU-A 20 triggers FPD 30 to start up using the configuration flash image, and trust is transferred from CPU-A 20 to FPD 30. In turn, FPD 30 performs similar validation process for a boot loader image from boot loader 70, e.g., using boot bus 95, and brings CPU-B 40 up to a trusted operating configuration, thereby further transferring trust from FPD 30 to CPU-B 40. Accordingly, a chain of processing trust is developed from CPU-A 20 to FPD 30 to CPU-B 40. In one example, FPD 30, or components thereof, may be integrated with CPU-A 20 to provide an additional layer of trusted operation to CPU-B 40. The boot process can be controlled at various boot stages, commonly referred to as "boot staging." A detailed example of the chain of trust transfer process is describe below in connection with FIGS. 2A, 2B, and 2C, while a more general process is describe below in connection with FIGS. 3A and 3B.

The component configuration shown in FIG. 1 is for three processors in a conceptually linear chain from top (CPU-A) to bottom (CPU-B). Other configurations are possible, e.g., $4^{th}$ and $5^{th}$ processing elements may be added to the linear chain, or $4^{th}$ or $5^{th}$ processors may be added in parallel with CPU-B 40, where FPD 30 provides validation services for CPU-B 40, as well as for the $4^{th}$ and/or $5^{th}$ processors. Furthermore, the linear or parallel processors do not necessarily need to be physical placed on a circuit in the manner shown in FIG. 1, as this depiction is conceptual. In other words, the components may be placed on a circuit board in a manner that simplifies manufacture and placement of the connection traces on the circuit board. Furthermore, the processors may be included as processors on a single circuit board or on separate circuit boards, e.g., line cards, in an embedded system, or that communicate via back plane or other bus architecture.

The native boot process for CPU-A 20 may be considered as a secure starting point or secure anchor point for purposes of developing a chain of trust according to the embodiments described herein. It is useful to provide a description of a couple of examples of the security techniques that may be daisy chained (in a conceptually linear and/or parallel fashion) to form the chain of processing trust to ensure the overall security of the processing chain of trust.

In one example, cryptographic keys may be stored in one or more of the components shown in FIG. 1 during device manufacture. The cryptographic keys may typically include symmetric keys and may also include public keys that can be published and private keys that are held in secret, and used to decrypt data encrypted using the public key. The public/private keys that are used are generally referred to in the context of a Public Key Infrastructure (PKI) cryptographic, although other encryption mechanisms may be employed. Thus, an image that was encrypted with a public key is decrypted by way of a private key in a corresponding component of device, e.g., a component in device 10. When symmetric keys are employed, the keys may be developed using the Advance Encryption Standard (AES) or by way of other key generation mechanisms. Symmetric key systems employ the same key for both encryption and decryption, thereby simplifying the cryptographic algorithms.

In addition to encryption, digital signatures may be employed to authenticate an image, e.g., boot loader and FPD images. For example, during the boot loader image validation for CPU-A 20, the boot loader image may have an associated digital signature that may be verified prior any decryption that may be necessary. When an image (encrypted or not) is digitally signed, the signed image is authenticated by the receiving device or component to verify the authenticity of the sender. For example, in this context, a processor or FPD may authenticate the digital signature of its corresponding boot or configuration image. When the signed image is authentic, the image is obtained and used. Digital signatures may employ various forms of encryption, e.g., PKI or AES, and used for, among other things, to verify the authenticity of the sender to a receiver as briefly described above.

The various forms of authentication and encryption are described as examples of techniques for ensuring the integrity of the chain of trust. Other techniques include the use of "hardened" electronic elements configured to endure attempts by a hacker or thief to break into the system, or steal the underlying intellectual property in the logic or software that can take years to develop. In this regard, CPU-A 20, boot loader 50, and pre-boot ROM 80 may form a TCB that may include FPD 30. With additional safeguards, FPD 30 and configuration flash 60 may be added and considered as part of the TCB, while CPU-B may be an inexpensive component that receives trust from the TCB. The hardened hardware can include tamper proof chips and tamper proof cryptography chips (TPCCs). For example, pre-boot ROM 80 or another component may be a TPCC that stores keys used for authentication and cryptographic processes described herein. The various keys may be supplied by way of a TPCC or stored on other devices, e.g., FPD 30 or configuration flash 60, depending on systems design parameters.

To further illustrate, a TPCC or secure crypto-processor is a dedicated computer on a chip or microprocessor for carrying out cryptographic operations, embedded in a package with multiple physical security measures, which give the package a degree of tamper resistance. Unlike cryptographic processors that output decrypted data onto a bus in a secure environment, a secure crypto-processor does not output decrypted data or decrypted program instructions in an environment where physical security cannot always be maintained. The purpose of a secure crypto-processor is to act as the keystone of a security sub-system, e.g., pre-boot ROM 80, thereby eliminating the need to protect the rest of the sub-system with physical security measures. Smart cards are one such example of a crypto-processor, that in and of itself provides some form of security.

Figure 2A:
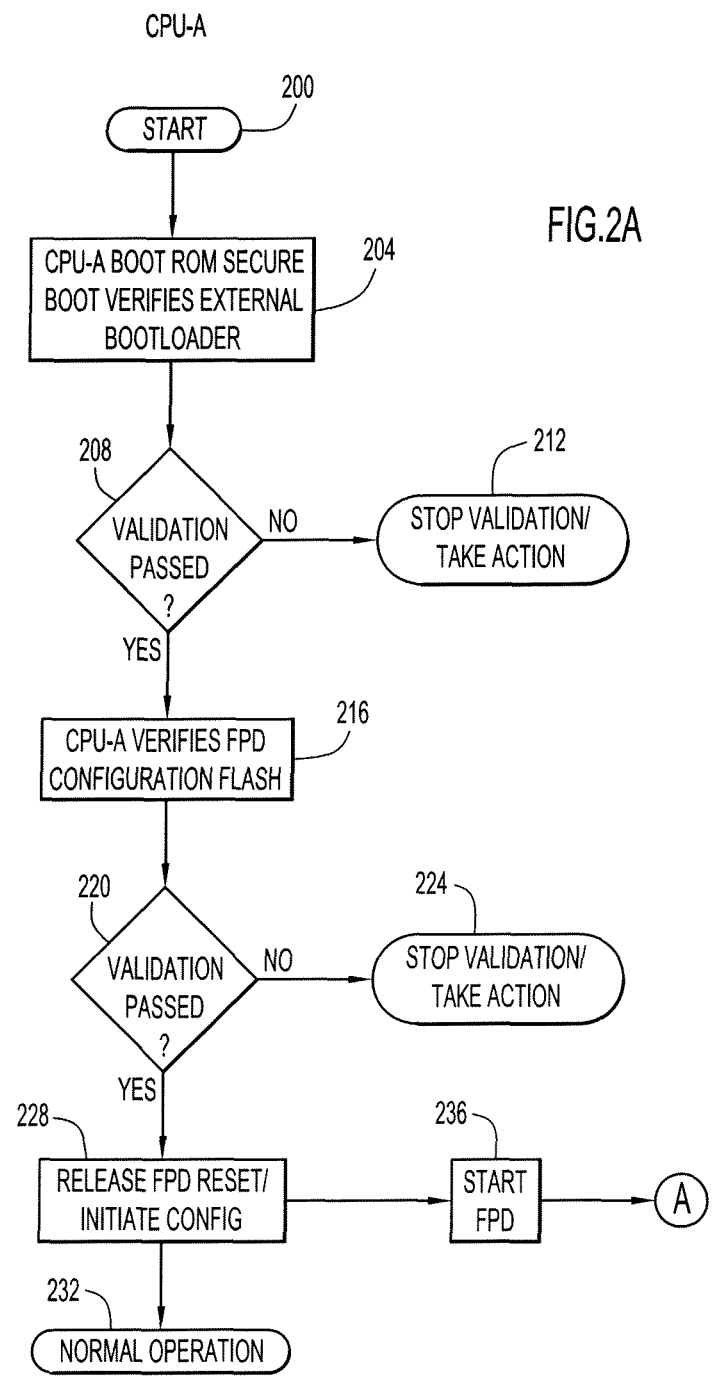
Figure 2C:
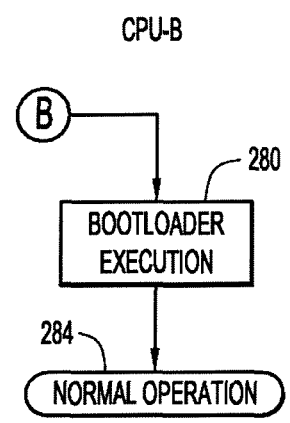

Referring to FIGS. 2A, 2B, and 2C, flowcharts of example approaches for generating the processing chain of trust by way a specific example process is now described. FIG. 2A generally shows processes with respect to CPU-A 20, FIG. 2B generally shows processes with respect to FPD 30, and FIG. 2C generally shows processes with respect to CPU-B 40. Turning now to FIG. 2A, the chain of trust transfer process starts at 200. At 204, pre-boot ROM 80 provides a secure pre-boot of CPU-A, and provides a mechanism to validate CPU-A's external boot loader, e.g., external boot loader 50. In one example, CPU-A holds a key, e.g., in pre-boot ROM 80, that can decrypt the boot loader image, e.g., the image stored in configuration boot loader 50.

At 208, it is determined whether the boot loader image is valid using security mechanisms that may include both authentication and decryption, e.g., a hash on the may be performed on the boot loader image to authenticate the image prior to decrypting the boot loader image. In other words, an authentication function may be included to increase the level of trust prior to decrypting the CPU-A boot loader image. When the image is not valid as determined by image authentication and/or decryption, at 212, CPU-A in the pre-boot configuration stops further activity in the chain of trust transfer process and may prohibit or inhibit some or all of the operations of CPU-A. CPU-A may take further action such as shutting down the device (device 10), resetting the device or processing element, sending an alarm signal to a system operator or place an entry in a log file indicating the validation failure, a time of failure, cause of failure, etc.

When the image is valid as determined at 208, at 216, CPU-A verifies the FPD image by image authentication and/or decryption. In one example, CPU-A holds a key that can decrypt the FPD image, e.g., the image stored in configuration flash 60. At 220, it is determined whether the FPD image is valid, e.g., by running a hash on the FPD image to authenticate the FPD image. When the image is not valid, at 224, CPU-A stops further trust transfers in the chain of trust and may prohibit the operation of the FPD. CPU-A may generate an alarm and place an entry into a log file. When the FPD image is valid, at 228, a FPD reset is triggered and the FPD begins to download the image in the configuration flash. The FPD image may be further decrypted by FPD 30. The CPU-A boot loader can execute at any time and, at 232, CPU-A begins normal operation.

At 236, the FPD is started, e.g., using a trigger, and the chain of trust transfer process continues on FIG. 2B. Referring to FIG. 2B, at 240, the FPD may perform a self-configuration process and optional self-validation process. The self-configuration and self-validation process checks any digital signatures and decrypts the FPD image. At 244, it is determined whether the self-validation is valid. When the self-validation fails, at 248, the FPD and/or CPU-A stop(s) further activity. The FGPA may signal CPU-A, and CPU-A may generate an alarm and creates a log entry, e.g., if the FPD cannot perform these tasks.

When the self-validation is valid as determined at 244, at 252, the FPD verifies the boot loader image for CPU-B. At 256, the FPD determines whether the boot loader image for CPU-B is valid, e.g., by running a hash on the boot loader image and/or decrypting the CPU-B boot loader image. When the image is not valid, at 260, CPU-B stops further activity in the chain of trust transfer process and may prohibit the operation of CPU-B. CPU-B or other components in the computing chain may take further action such as sending an alarm signal to a system operator or place an entry in a log file.

When the image is valid as determined at 256, at 264, the FPD releases and resets CPU-B. At 268, the FPD monitors boot loader execution for CPU-B. At 276, CPU-B is started and the chain of trust transfer process continues, as depicted in FIG. 2C. Referring to FIG. 2C, at 280, the boot loader for CPU-B is executed while being monitored by the FPD. The FPD can "snoop" the boot bus, e.g., boot bus 95 (FIG. 1), to monitor the activity on the boot bus including data sources and data destinations. The FPD can monitor the image load and verify the image, or the FPD can monitor and verify the source of the boot loader image. If the image is not valid or is loaded from an unauthorized location, the FPD can take appropriate action such as prohibiting the operation of CPU-B, sending an alarm, etc. After proper boot loader execution, at 284, CPU-B begins normal operation.

It should be noted, processors 20 and 40 may be a programmable processor, e.g., microprocessor, digital signal processor, or microcontroller or a fixed-logic processor such as an. Such a processor includes internal and/or associated memory that may be of any type of tangible processor readable memory (e.g., random access, read-only, etc.) that is encoded with or stores instructions, such as chain of trust transfer software to facilitate the techniques described herein. In another example, chain of trust transfer software may be executed by a tamper proof chip or executed by a combination of processors and the tamper proof chip. Alternatively, processors 20 and 40 may be comprised of a fixed-logic processing device that is configured with firmware comprising instructions to perform the functions described herein. In this regard, FPD 30 may be any form of programmable processor.

Thus, the processing component, e.g., in device 10, may take any of a variety of forms, so as to be encoded in one or more tangible (e.g., non-transitory) storage media for execution, such as with fixed logic or programmable logic (e.g., software/computer instructions executed by a processor) and any processor may be a programmable processor, programmable digital logic (e.g., an FPGA) or an ASIC that generally comprises fixed digital logic, or a combination thereof. In general, software may be embodied in a processor readable medium that is encoded with instructions for execution by a processor that, when executed by the processor, are operable to cause the processor to perform the functions described herein.

It is noted that the functionality described herein for computing device 10 is generally implemented as part of an embedded device such a cell phone or a network router. The techniques may also be implemented by non-embedded applications such as general purpose computers for which a chain of trust is desirable.

Figure 3A:
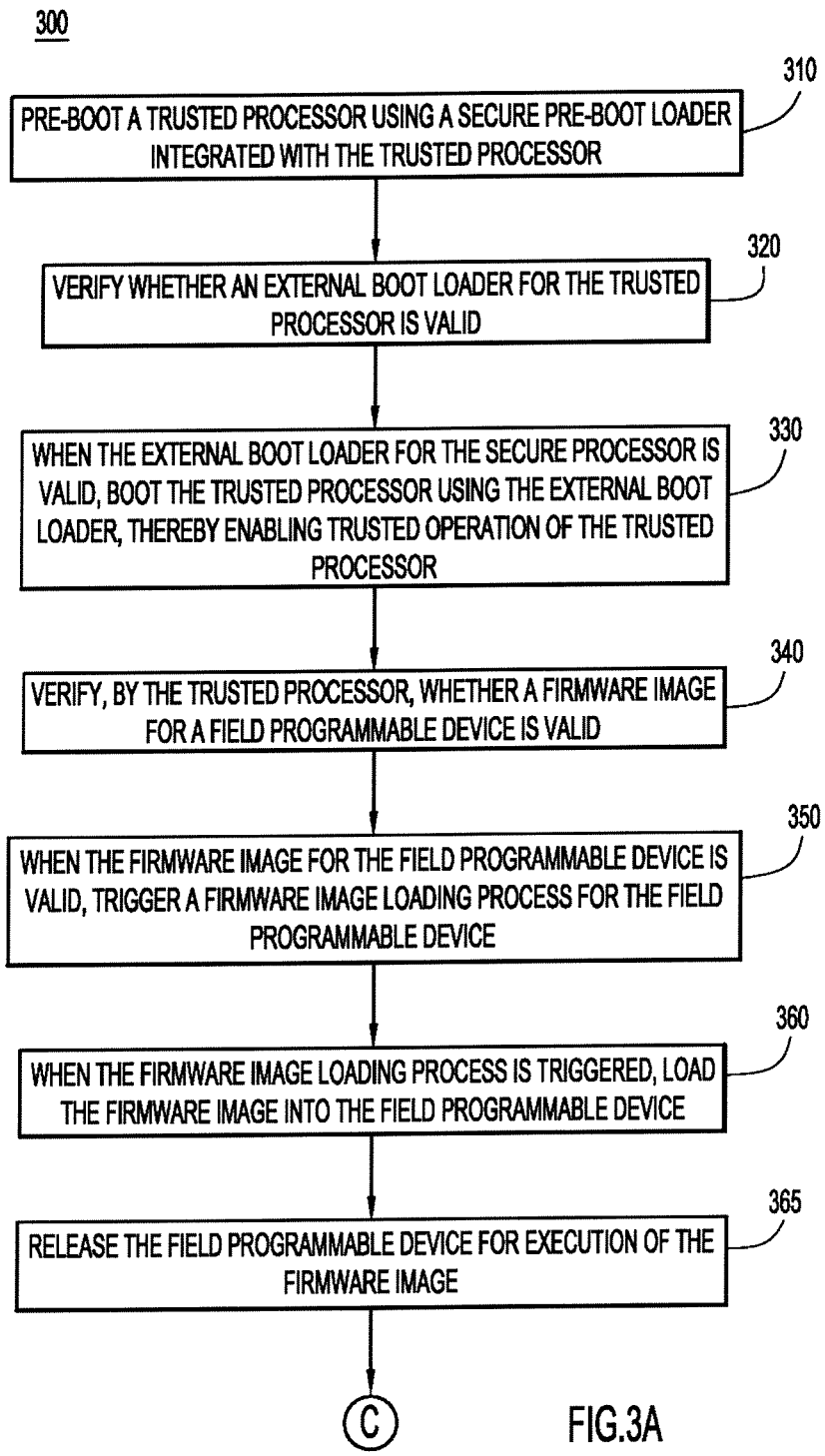
FIGS. 3A and 3B are flowcharts of a more generalized process for generating the processing chain of trust.
Figure 3B:
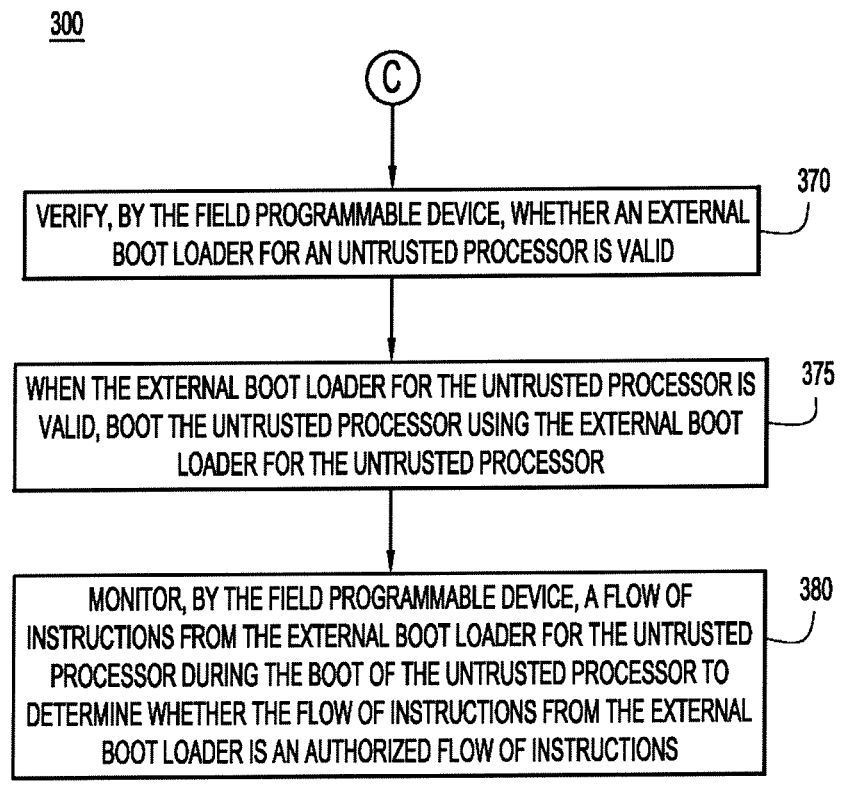

FIGS. 3A and 3B depict example flowcharts for generating the processing chain of trust by way a more generalized process 300. At 310, a trusted processor is pre-booted using a secure pre-boot loader integrated with the trusted processor. At 320, whether an external boot loader for the trusted processor is valid. At 330, when the external boot loader for the secure processor is valid, the trusted processor is booted using the external boot loader, thereby enabling trusted operation of the trusted processor. At 340, it is verified, by the trusted processor, whether a firmware image for a field programmable device is valid, and at 350, when the firmware image for the field programmable device is valid, a firmware image loading process is triggered for the field programmable device.

At 360, when the firmware image loading process is triggered, the firmware image is loaded into the field programmable device. At 365, the field programmable device is released to execute the firmware image, and the trust transfer process continues on FIG. 3B. Turning to FIG. 3B, at 370, the field programmable device verifies whether an external boot loader for an untrusted processor is valid. At 375, when the external boot loader for the untrusted processor is valid, the untrusted processor is booted using the external boot loader for the untrusted processor. At 380, the field programmable device monitors a flow of instructions from the external boot loader for the untrusted processor during the booting of the untrusted processor to determine whether the flow of instructions from the second external boot loader is an authorized flow of instructions.

To summarize, techniques are presented herein for establishing a processing chain of trust. Trust is transferred from a trusted processor to an untrusted processor by way of an FPD.

Thus, a method is provided comprising pre-booting a trusted processor using a secure pre-boot loader integrated with the trusted processor. The trusted processor verifies whether an external boot loader is valid, and when valid, the trusted processor is booted using the external boot loader, thereby enabling trusted operation of the trusted processor. The trusted processor verifies whether a firmware image for a field programmable device is valid, and when valid, a firmware image loading process for the field programmable device is triggered. When the firmware image loading process is triggered, the firmware image is loaded into the field programmable device and the field programmable device is released to execute of the firmware image. The field programmable device verifies whether an external boot loader for an untrusted processor is valid, and when valid, the untrusted processor is booted using the external boot loader for the untrusted processor, thereby enabling trusted operation of the untrusted processor.

An apparatus is provided comprising an untrusted processor, an external boot loader for the untrusted processor, a field programmable device, an image storage circuit configured to store a firmware image for programming the field programmable circuit, and an external boot loader for an untrusted processor. The trusted processor comprises an integrated pre-boot loader and the trusted processor is configured to: verify whether the external boot loader for the trusted processor is valid, when the external boot loader for the secure processor is valid, boot the trusted processor using the external boot loader, thereby enabling trusted operation of the trusted processor, verifying whether the firmware image stored in the image storage circuit for the field programmable device is valid, and when the firmware image for the field programmable device is valid, trigger a firmware image loading process for the field programmable device. The field programmable device is configured to: receive the trigger for the firmware image loading process is triggered, load the firmware image into the field programmable device, and where the trusted processor is further configured to release the field programmable device to execute the firmware image. The field programmable device is further configured to: verify whether an external boot loader for the untrusted processor is valid, and when the external boot loader for the untrusted processor is valid, initiate a boot of the untrusted processor using the external boot loader for the untrusted processor.

Further still, a processor readable storage media is provide that is encoded with instructions that, when executed by a processor, cause the processor to receive a trigger from a trusted processor when a firmware image has been verified as valid by the trusted processor, when the trigger is received, load the firmware image, receive a release from the trusted processor comprising information to allow execution of the firmware image, when the release is received, execute the firmware, verify whether an external boot loader for an untrusted processor is valid, and when the external boot loader for the untrusted processor is valid, send a signal to the untrusted processor comprising information to allow the untrusted processor to execute the external boot loader image for the untrusted processor.

These techniques have the advantage that a chain of trust can be developed for an untrusted processor without have to replace the untrusted processor with a more expensive TCB. Furthermore, even if there exists an ability for N CPUs in an embedded system to natively perform a securely boot, the expense and complexity of that design is prohibitive. For example, absent the techniques provides herein, revoking cryptographic keys on a multitude of N processors is extremely difficult to manage. Accordingly the techniques described herein reduce the cost and complexity by using fewer native roots of trust thereby reducing the number of places that difficult problems such as key revocation have to be dealt with.

The above description is intended by way of example only.

What is claimed is:

1. A method comprising:
   pre-booting a trusted processor using a secure pre-boot loader integrated with the trusted processor;
   verifying whether an external boot loader for the trusted processor is valid;
   when the external boot loader for the secure processor is valid, booting the trusted processor using the external boot loader, thereby enabling trusted operation of the trusted processor;
   first verifying, by the trusted processor, whether a firmware image for a field programmable gate array (FPGA) is valid;
   when the firmware image for the FPGA is valid, triggering a firmware image loading process for the FPGA;
   verifying, by the FPGA, whether an external boot loader for an untrusted processor is valid;
   when the external boot loader for the untrusted processor is valid, booting the untrusted processor using the external boot loader for the untrusted processor;
   when the external boot loader for the untrusted processor is not valid, raising, by the FPGA, an alarm, and causing an entry to be placed in a log file,
   when the firmware image loading process is triggered, loading the firmware image into the FPGA;
   releasing the FPGA for executing the firmware image, and monitoring, by the FPGA, a flow of instructions from the external boot loader for the untrusted processor during the booting of the untrusted processor to determine whether the flow of instructions from the second external boot loader is an authorized flow of instructions.

2. The method of claim 1, further comprising generating a processing chain of trust comprising a plurality of processors including the trusted processor and the FPGA such that trust is transferred from the trusted processor to the FPGA when the firmware image for the FPGA is valid.

3. The method of claim 2, when the flow of instructions from the external boot loader for the untrusted processor is an authorized flow of instructions further comprising adding the untrusted processor to the chain of trust, thereby allowing trusted operation of the untrusted processor.

4. The method of claim 1, further comprising:
   second verifying, by the FPGA, whether the firmware image is valid prior to releasing the FPGA for execution of the firmware image; and
   when the firmware image for the FPGA is valid as determined by the FPGA, releasing the FPGA for execution of the firmware image.

5. An apparatus comprising:
   an untrusted processor;
   an external boot loader for the untrusted processor;
   a field programmable gate array (FPGA);
   an image storage circuit configured to store a firmware image for programming the FPGA;
   a trusted processor; and
   an external boot loader for the trusted processor;
   the trusted processor comprising an integrated pre-boot loader, the trusted processor being configured to:
   verify whether the external boot loader for the trusted processor is valid;
   when the external boot loader for the trusted processor is valid, boot the trusted processor using the external boot loader, thereby enabling trusted operation of the trusted processor;
   verify, using trusted operation of the trusted processor, whether the firmware image stored in the image storage circuit for the FPGA is valid;
   when the firmware image for the FPGA is valid, trigger a firmware image loading process for the FPGA;
   verify, by the FPGA, whether an external boot loader for an untrusted processor is valid;
   when the external boot loader for the untrusted processor is valid, boot the untrusted processor using the external boot loader for the untrusted processor;
   when the external boot loader for the untrusted processor is not valid, raise, by the FPGA, an alarm, and cause an entry to be placed in a log file,
   wherein the FPGA is configured to:
   receive the trigger for the firmware image loading process; and
   load the firmware image into the FPGA,
   wherein the trusted processor is further configured to release the FPGA to execute the firmware image,
   wherein the trusted processor is a first processor in a processing chain of trust, and the trusted processor is further configured to add the FPGA to the processing chain of trust when the firmware image for the FPGA is valid, and
   wherein the trusted processor is a further configured to add the untrusted processor to the processing chain of trust when the flow of instructions from the external boot loader for the untrusted processor is an authorized flow of instructions, thereby allowing trusted operation of the untrusted processor.

6. The apparatus of claim 5, wherein the FPGA is further configured to:
   verify whether an external boot loader for the untrusted processor is valid; and when the external boot loader for the untrusted processor is valid, initiate a boot of the untrusted processor using the external boot loader for the untrusted processor.

7. The apparatus of claim 5, wherein the FPGA is further configured to verify whether the firmware image is valid prior to releasing the FPGA for execution of the firmware image.

8. A field programmable gate array (FPGA) encoded with instructions that, when executed, cause the FPGA to:
   receive a trigger from a trusted processor when a firmware image has been verified as valid by the trusted processor;
   when the trigger is received, load the firmware image;
   receive a release from the trusted processor comprising information to allow execution of the firmware image; and
   when the release is received, execute the firmware image;
   verify whether an external boot loader for an untrusted processor is valid;
   when the external boot loader for the untrusted processor is valid, send to the untrusted processor a signal comprising information to allow the untrusted processor to execute the external boot loader for the untrusted processor;
   when the external boot loader for the untrusted processor is not valid, raise an alarm and cause an entry to be placed in a log file, and
   cause the FPGA to monitor a flow of instructions from the external boot loader for the untrusted processor during the boot of the untrusted processor to determine whether the flow of instructions from the external boot loader for the untrusted processor is an authorized flow of instructions.

9. The FPGA of claim 8, further comprising instructions that, when executed, cause the FPGA to add the untrusted processor to a processing chain of trust when the flow of instructions from the external boot loader for the untrusted processor is an authorized flow of instructions, thereby allowing trusted operation of the untrusted processor.

10. The FPGA of claim 8, wherein the instructions that monitor the flow of instructions from the external boot loader for the untrusted processor during the boot of the untrusted processor further comprise instruction that monitor a boot bus for the untrusted processor.

11. The FPGA of claim 8, further comprising instructions that, when executed, cause the FPGA to stop operation of the untrusted processor when the flow of instructions from the external boot loader for the untrusted processor is an unauthorized flow of instructions.

12. The FPGA of claim 8, further comprising instructions that, when executed, cause the FPGA to verify whether the firmware image is valid prior to executing the firmware image.

* * * * *